United States Patent [19]

Hicks et al.

[11] 4,173,168

[45] Nov. 6, 1979

[54] APPARATUS FOR SELF TEACHING A MUSICAL INSTRUMENT

[75] Inventors: Patrick C. Hicks, 5140 Greenbush, Sherman Oaks, Calif. 91403; Ronald J. Benson, Arleta, Calif.; Howard M. Roberts, North Bend, Oreg.

[73] Assignee: Patrick C. Hicks, Hollywood, Calif.

[21] Appl. No.: 838,980

[22] Filed: Oct. 3, 1977

[51] Int. Cl.$^2$ ............................................. G09B 15/00
[52] U.S. Cl. ................................. 84/470 R; 84/462; 84/DIG. 17
[58] Field of Search .................. 84/470 R, 454, 462, 84/DIG. 3, DIG. 17; D14/1, 2; D56/1 B, 1 R; 340/309.1

[56] References Cited

U.S. PATENT DOCUMENTS

| D. 228,135 | 8/1973 | Haueter | D14/1 |
|---|---|---|---|
| 3,001,431 | 9/1961 | Andersen | 84/470 |
| 3,433,116 | 3/1969 | Althoff | 84/454 |
| 3,541,915 | 11/1970 | Rhodes | 84/470 |
| 3,931,621 | 1/1976 | Rose | 340/309.1 |

OTHER PUBLICATIONS

Stereo Buying Guide, Circuit City Co., Winter, 1977 edition, Nov. 20, 1977, pp. 36-37.

Primary Examiner—L. T. Hix
Assistant Examiner—S. D. Schreyer
Attorney, Agent, or Firm—John E. Wagner

[57] ABSTRACT

Apparatus to be used in conjunction with the practicing of a musical instrument is described. The circuit contains and interconnects an electronic metronome, a timer, a tape recorder, a tone generator, earphones, and the electronics for integrating these elements, as well as an internal power supply. This apparatus is particularly well suited to the needs of the advanced student who plays well and desires to progress to the professional level since the interaction of the elements forces the student to play the instrument with speed and accuracy while under time pressure. The combination of elements also leads to a flexibility of functions. Finally, all elements are implemented from electronic components, resulting in a small, low cost, reliable system.

1 Claim, 3 Drawing Figures

APPARATUS FOR SELF TEACHING A MUSICAL INSTRUMENT

BACKGROUND OF THE INVENTION

The apparatus described herein is a circuit used as an aid in the self-teaching of a musical instrument, and more particularly is a small low-cost electrical circuit for simulating and integrating the functions of timer, metronome, tape recorder, and audio mixer into one unit.

One aid commonly used in the self-teaching of a musical instrument is the metronome, a mechanical device for producing periodic audio timing pulses. Recently, electronic metronomes have become available. Tape recorders may also be used to advantage, allowing one to tape a practice piece, and replay it at a later time for analysis. Practice records are available. These frequently produce background rhythm and are accompanied by written instructions on how to practice an instrument while listening to the record. Amplifiers for instruments are universal, and may be provided with earphones so that only the student can hear the sound, allowing practice without distractions or disturbing others.

The usefulness of these aids, however, has always been limited because they have never been integrated into one system. Integration leads to a wide variety of new applications since the function of each element can complement that of another element. For example, in a system containing a metronome and a tape recorder, the musician can listen to the metronome while recording the harmony and then listen to the harmony while playing the melody, all at metronome speed. If each student used earphones, a number could practice in the same room while a teacher monitored each student through a set of monitor earphones. If, in addition, all elements of this system were implemented from electronic parts, the resultant system would be reliable, low in cost, and small in size.

SUMMARY OF THE INVENTION

The circuit herein described contains an electronic metronome variable from forty to two hundred ten beats per minute, a timer settable from thirty seconds to forty-five minutes, an audio tone generator, one set of earphones, a tape recorder and the electronics necessary to functionally connect these elements in all useful combinations, as well as an internal power supply for converting line current to a low dc level suitable for solid state electronic circuits. The entire system is fitted in a carrying case, which upon being opened, provides easy access to the control panels of the electronic circuits and the tape recorder.

The student will wear the earphones continuously, and by appropriate switch settings, select any desired mode of operation, each mode being any possible combination of elements. For example, the metronome output may be routed to the tape recorder or to the earphones. This gives the student one option of recording both instrument and metronome outputs on tape and later analyzing the composite for accuracy and precision in the playing of the instrument. Another option is to listen to the metronome while recording the harmony and then listen to the harmony while playing the melody. In the latter case, the metronome is used to aid the student in creating an accurately timed background track for subsequent practice. Thus, it is clear that the provision of an integrated system where all elements may be connected in all useful combinations creates an instrument practice aid of great flexibility and usefulness.

It is especially important from a motivational standpoint that the instrument be practiced in a musical context rather that as a series of standard exercises. Thus, the provision of earphones and tape recorder allows the student to practice a piece of music containing the exercise rather than simply practice the exercise alone.

It is thus an object of this invention to provide apparatus for used by a person who is practicing on a musical instrument which combines the functions of a timer, metronome, tone generator, and tape recorder in a small, low-cost integrated unit.

DETAILED DESCRIPTION OF THE INVENTION

Figure 1:
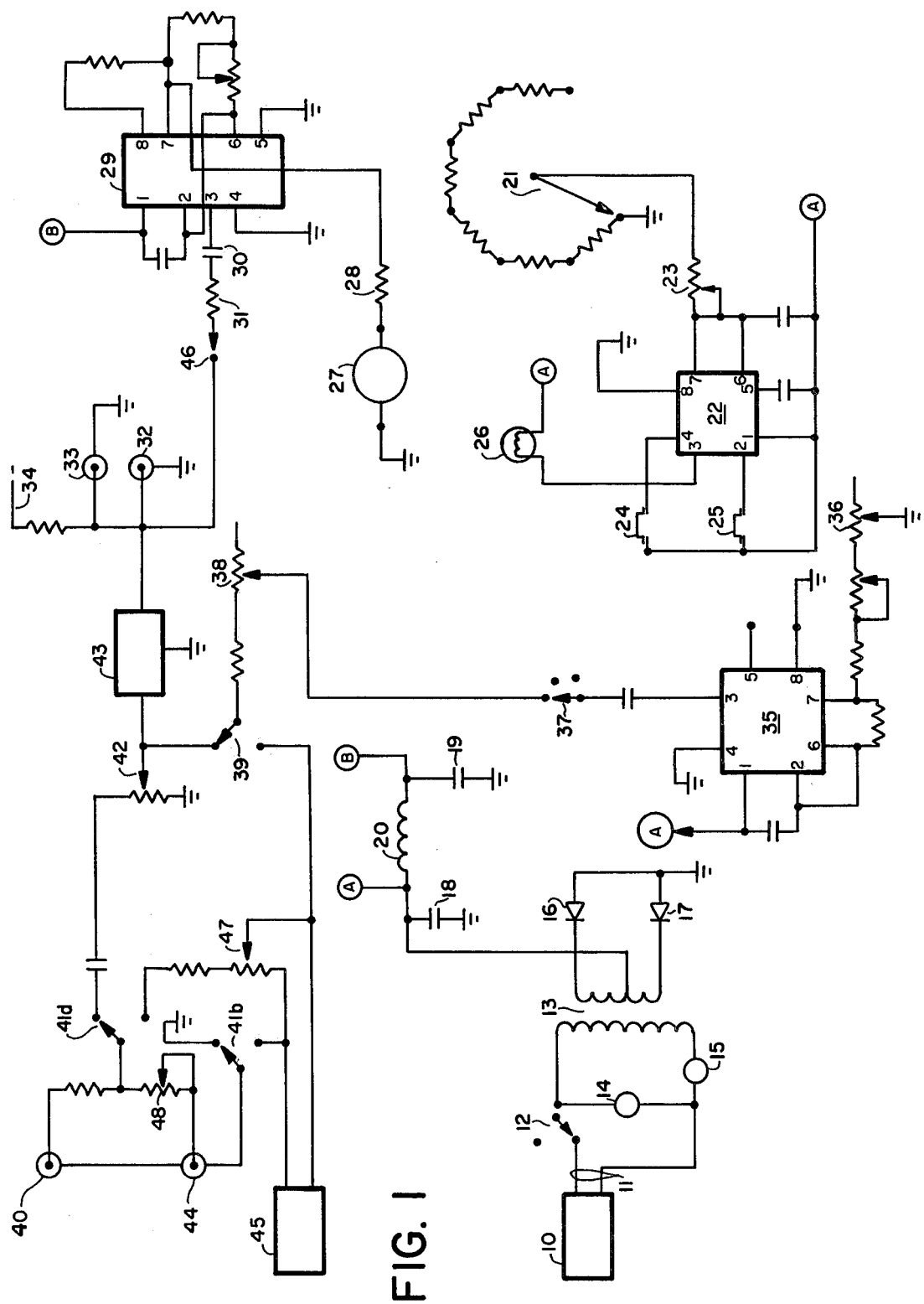
FIG. 1 is a schematic of said circuits.

FIG. 1 is a schematic diagram of the inventive circuit. In the power supply section, the plug 10 and line cord 11 supply 12-volt 60 cycle power to the on-off switch 12, transformer 13 primary, and power on indicator lamp 14. A fuse 15 is provided. The current from the transformer secondary is full-wave rectified through diodes 16 and 17, and filtered through capacitors 18 and 19 and inductor 20 to supply relatively filtered minus nine volts at point B and unfiltered minus nine volts at point A.

During use, the student may decide to set the timer circuit which uses an N E 555 pulse generator 22 to generate a pulse after a period of time set by the student on the timer switch 21. The variation of resistance to ground from pin 7 of the pulse generator 22 determines the total elapsed time which may vary from thirty seconds to forty-five minutes, depending on the values of resistance of variable resistor 23 and the amount of series resistance switched in by rotary switch 21. After a pulse has been generated, depression of the reset switch 24 will bring the time interval counter in the N E 555 back to zero. Thereafter, depressing the start switch 25 will restart the time interval counter.

The pulse generator 22 pin 3 output is connected to a lamp 26 which is lit for the duration of the pulse at the end of the elapsed time. In this embodiment, the light is visible to the student as a visual indication that the preset time has elapsed, and the pulse generator output 22 is also used in a tone generating circuit to provide an audio indication as well. In an alternate embodiment, this pulse could be used to shut down the circuit by turning the power off.

The tone generator circuit monitors the timer output. One method is to monitor the lamp by means of a photo cell 27 which operates through resistor 28 to turn on tone generator 29. This N E 555 is set by the resistive network at pins 6 and 7 to produce a tone which is output through capacitor 30, resistor 31, and switch 46, to two sets of earphones 32 and 33. This tone is a calibrated A 440 Hz tone characteristic of note A so that is can also be used to tune the instrument.

The tape recorder output line 34 is coupled to the earphones so that the tape recorder output, subject to the playback and volume controls on the tape unit, is available to the student.

It is desirable that the student record as often as possible during practice. This is desirable since a musician must be accustomed to playing under recording conditions, and eventually, before audiences. The first step, then, is to include a recorder as part of the apparatus and encourage the student to use it.

The metronome 35 is another N E 555 set to produce a repetitive audio pulse at a time interval set by variable resistor 36 and the remainder of the resistive network at pins 6 and 7. These pulses, at the preset repetition rate, are coupled through pin 3 of the metronome 35, through a metronome on-off switch 37 to an amplitude control 38 which is mechanically coupled to the on-off switch 37 so that the fully counter-clockwise position of the amplitude control also drives switch 37 to its off position. From the amplitude control 38, the metronome signal is coupled to a switch 39 which allows the metronome to be heard by the student through his earphones or to be coupled to the tape recorder input.

The instrument, or a microphone, is plugged into receptacle 40 or 44, and is coupled through instrument volume control 48. When switches 41a or 41b are in the down position, the instrument or microphone output is coupled to the tape recorder input 45 through tape volume control 47. With switch 41a and 41b in the up position, the audio is coupled to a master volume control 42 and through an amplifier 43 to the earphones 32 and 33.

This apparatus, by integrating a plurality of learning aids, may be used to advantage by anyone involved in the practice of a musical instrument, but is especially useful for one who already plays well, and is interested in progressing to the professional level. This is because an integrated system minimizes the time required to switch between functions, and the time required to adjust the functions themselves.

The earphones are built into noise barriers to isolate the student from outside noise and distractions, thus allowing greater concentration.

The tape recorder allows instant playback for an analysis of the last recorded piece, and also allows the recording of harmony and the subsequent repetitive playback of that harmony while the student practices the melody.

The timer forces the student to learn a piece in a given amount of time. It can also be used to allot time to specific practice routines. By providing specific time periods for individual practice routines, the student learns to perform under time pressure, and is programmed to go on to the next learning step after the allotted time.

The metronome, when used properly, is set to the highest speed at which the student can perform with precision. At each speed, the student records the harmony and practices the melody. When this speed is mastered, the metronome speed may be increased by, perhaps, 5 beats per minute. Of course, each practice session duration may be pre-determined and set into the timer to provide time pressure.

Figure 2:
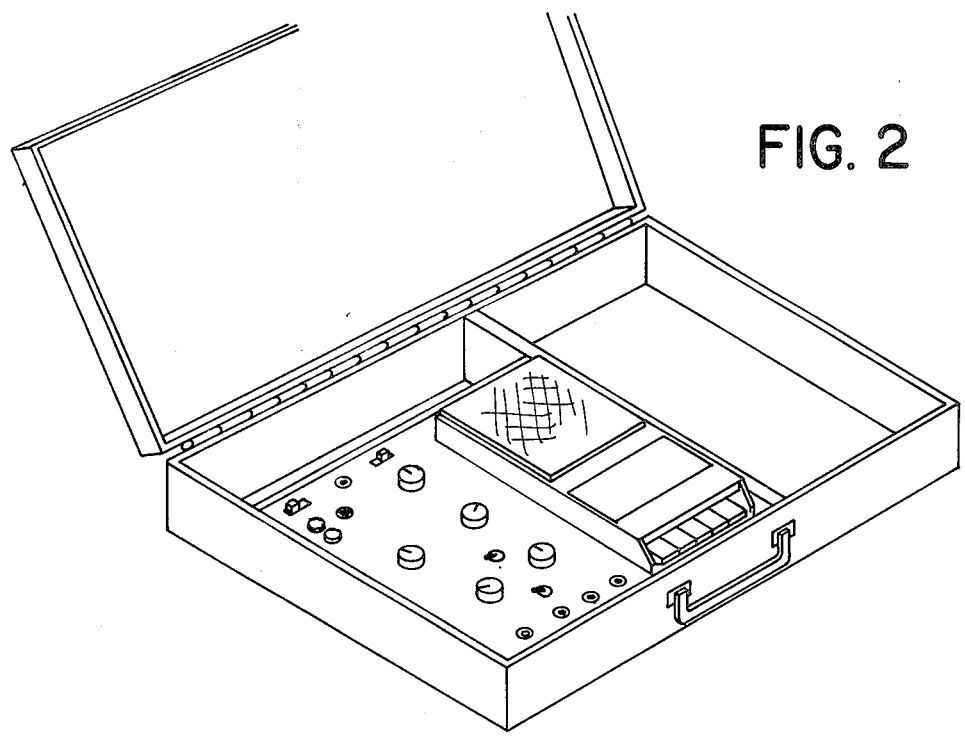
FIG. 2 is an alternate embodiment containing a removable tape recorder.
Figure 3:
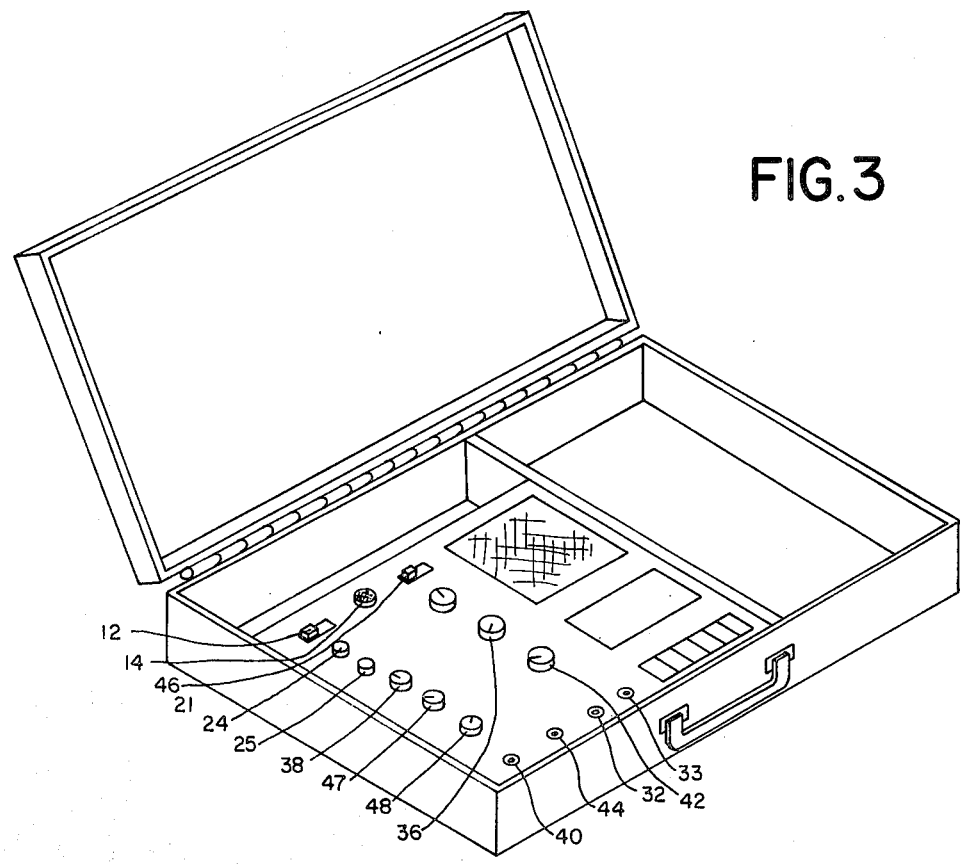
FIG. 3 is a perspective view of the carrying case containing the front panel and an integral tape recorder.

FIGS. 2 and 3 are alternate carrying case embodiments. In both cases, the electronic circuit front panel is located on the left, the tape recorder in the center, and two storage areas for miscellaneous items like tape cassettes, earphones, and microphones occupy the remaining volume. One difference is that in FIG. 3, the tape recorder is built into the electronic assembly, while in FIG. 2, the tape recorder is removeable.

The layout of controls in FIG. 3 corresponds to the schematic of FIG. 1. The controls across the top of the front panel from left to right are the power on-off switch 12, the pilot light 14 and the tone generator switch 46. Across the bottom are the instrument and microphone jacks 40 and 44, and the headphone jacks 32 and 33. Along the left edge from the top are the start switch 24, the reset switch 25, the metronome volume 38, the tape volume 47, and the instrument volume 48. The remaining controls from the top to bottom are the timer switch 21, the metronome frequency adjustment 36, and the master volume control 42.

It may be convenient to have the option of recording from the mixer and from the tape recorder simultaneously. This would occur when the recording should include audio over the instrument sound, or during the recording of music produced on an acoustical instrument. For this use, an additional switch may be added to the flat panel to allow the tape recorder's condenser microphone to be used simultaneously with the input jack, the switch simply connecting or disconnecting the microphone when the tape recorder is in the "record" mode and when the input jack is in place.

This inventive apparatus was designed specifically for use in practicing the guitar, but could be used with any musical instrument.

The above described embodiments and methods are furnished as illustrations of the principles of this invention and are not intended to define the only embodiments possible in accordance with out teachings. Rather, protection under the United States Patent Law shall be afforded to us not only to the specific embodiments above, but to those falling within the spirit and terms of the invention as defined in the following claims.

We claim:

1. An integrated portable instructional apparatus for music instruction use comprising:

a portable case including a body portion openable cover and carrying means;

music instructional apparatus within said case comprising in combination;

a metronome for generating controllable frequency timing signals for establishing any of several music tempos;

a tape recorder for recording music produced by the user and for playing music produced by the user or pre-recorded music;

a jack for connecting said apparatus to earphones;

a timer for providing an indication to the user of elapsed time period during use of the apparatus;

said apparatus including input jacks to receive electrical input signals from at least one musical instrument and from said tape recorder;

switch means for selectively introducing electrical signals from said instrument input jack to the input of said tape recorder or to said earphone jack;

switch means for enabling said metronome and for setting the amplitude thereof;

switch means for enabling and selecting the time interval of said timer;

a signal generator responsive to the completion of a time interval as selected by said last switch means;

means for introducing the output of said signal generator into the jack for said earphone;

switch means for selectively introducing the output of said metronome into said earphone jack or said recorder;
individual volume control means for said instrument, tape recorder, metronome, and signal generator; and
means within said case mounting said tape recorder and its controls and each of said switch means and each volume control means for operation by said user when said cover is open to initiate and control the volume of tempo signals from said metronome, signals from user's instrument, timer signals from said signal generator and the recorder whereby user may control practice duration by the timer switch, tempo by said said metronome and for listening to pre-recorded or user's own instrument input either with or without tempo signal background.

* * * * *